US008727888B2

(12) United States Patent
Walters

(10) Patent No.: US 8,727,888 B2
(45) Date of Patent: May 20, 2014

(54) SYSTEM AND METHOD FOR DRAFT SELECTION AND PARTICIPATION THEREIN

(76) Inventor: John H. Walters, Townsend, MA (US)

( * ) Notice: Subject to any disclaimer, the term of this patent is extended or adjusted under 35 U.S.C. 154(b) by 159 days.

(21) Appl. No.: 13/341,040

(22) Filed: Dec. 30, 2011

(65) Prior Publication Data

US 2012/0101603 A1    Apr. 26, 2012

Related U.S. Application Data

(63) Continuation-in-part of application No. 12/213,667, filed on Jun. 23, 2008, now abandoned.

(60) Provisional application No. 60/945,462, filed on Jun. 21, 2007.

(51) Int. Cl.
 *A63F 13/12* (2006.01)
 *F23N 1/02* (2006.01)

(52) U.S. Cl.
 USPC ............................................. 463/42; 705/17

(58) Field of Classification Search
 USPC ............................................. 463/42; 705/17

IPC ... A63F 13/12,2300/17; F23N 1/02; F22G 5/06
 See application file for complete search history.

(56) References Cited

U.S. PATENT DOCUMENTS 6,240,415 B1 *  5/2001  Blumberg ............................ 1/1
2008/0262905 A1 * 10/2008  Casella et al. .................. 705/12

* cited by examiner

Primary Examiner — William M. Brewster
(74) Attorney, Agent, or Firm — Gianna Julian-Arnold; Saul Ewing LLP

(57) ABSTRACT

A fan-based draft is disclosed whereby fans select an $8^{th}$ round draft choice pursuant to a pre-designated voting structure within a reality show format. Fans select players from an eligible pool. NFL teams draft an $8^{th}$ round choice based on fan selection. The player participates in the team's pre-season training. The player receives an incentive such as a signing bonus. The incentive is paid by the show and/or sponsor(s). Team expenses related to pre-season training are also paid by the show and/or sponsor(s). The player is eligible for a space on the team roster and/or a long-term contract; however the team is not required to provide either. A portion of profits earned are invested into a retired player's fund.

8 Claims, 2 Drawing Sheets

SYSTEM AND METHOD FOR DRAFT SELECTION AND PARTICIPATION THEREIN

CROSS-REFERENCE TO RELATED APPLICATIONS

This application is a Continuation-In-Part (CIP) of U.S. patent application Ser. No. 12/213,667, filed Jun. 23, 2008, and entitled "System and Method For Draft Selection and Participation Therein," and claims further priority to 60/945,462 filed Jun. 21, 2007, each of which is hereby incorporated by reference in its respective entirety for all purposes.

FIELD OF THE INVENTION

The present invention relates to a system and method for draft selection, specifically a means for fan participation and a means for financing a financial safety net for retired players.

SUMMARY OF THE INVENTION

The present invention provides a computer-implemented method and system for enabling user participation in player selection during a league draft. It is therefore an object of the present invention to provide a method for draft selection and participation therein that includes determining a plurality of available players eligible for draft selection after a plurality of draft selection rounds, publishing this listing of available players, receiving player selections from authorized users, determining which player for each team receives the most selections and assigning each of these players to the respective teams. It is a further object to provide a system for the method including a first processor for determining the plurality of available players eligible for draft selection after a plurality of draft selection rounds, a display device for publishing this listing of available players, a user interface for receiving the player selections from authorized users and a tallying system for determining which player for each team receives the most selections.

DETAILED DESCRIPTION

Figure 1:
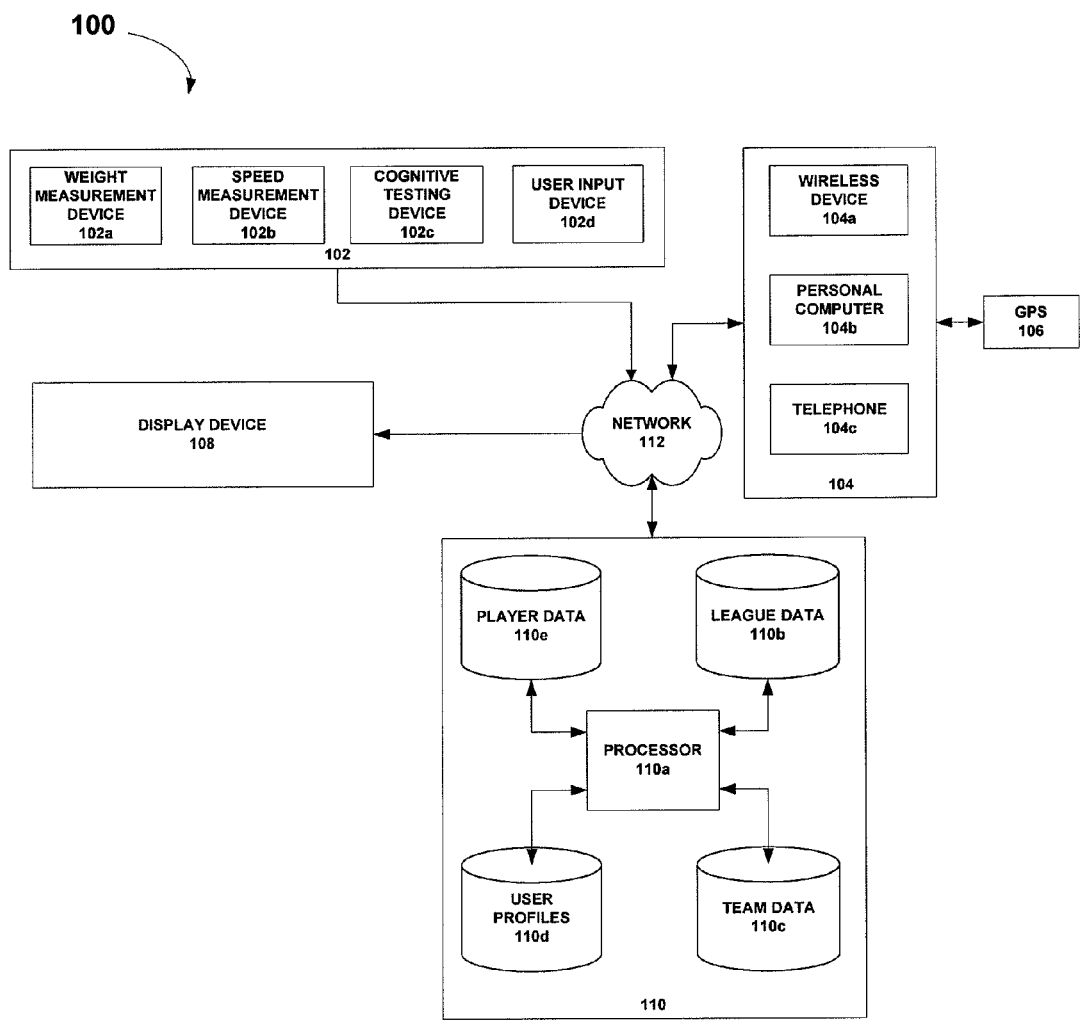
FIG. 1 illustrates a system in accordance with one embodiment of the present invention for enabling player selection in a league drafting process.

In accordance with one or more embodiments of the present invention, the provided examples refer to the National Football League (NFL). However, it is contemplated that the system and method disclosed herein could be used with a variety of groups and a range of circumstances. For example, the system and method may also be used with, but not limited to, Major League Baseball (MLB), the National Hockey League (NHL), the National Basketball Association (NBA), etc.

In practice, one or more sponsors selects a format structure. Such structure can comprise participation in a financial vehicle established by sponsor. Such participation can include buying, reviewing or sampling sponsor's product. Alternatively, such structure can comprise a contest, rebate or call request to vote.

Fans participate pursuant to format guidelines. It is contemplated that fans can vote at sponsors' facility, by coupon, on sponsor's web site, by cell phone, or by way of others means as would be known by one of ordinary skill in the art.

Fans select a draft choice from an eligible pool. In a first embodiment eligible pool shall comprise undrafted free agents (UDFA) Group 2. Every team loses players each year through retirement, injury, trades, or defection at contract conclusion. Thus, the team roster must be replenished each year. Only about eight percent of eligible players are formally drafted in the seven round session (Official NFL Draft) by each of the 32 NFL teams. These sessions generally occur in April, and last two days (time is allotted per each pick to field trades or reconsider alternative choices). About 224 players get drafted each year. Each team may also be eligible for certain compensatory added draft choices. These are awarded by the NFL to teams that lose a top tier player in the previous season to other teams, when they cannot reach contractual agreements with those players. Teams may draft players that are not a participant in the formal seven-round session. These players may come from smaller schools or may have experienced injury that precluded their participation in the seven-round draft. Approximately five to seven percent of players are bid for and signed as undrafted free agents (UDFA). Teams approach UDFA player's agents and make offers for services and for try-outs. There is no draft order. This is open bid. This group is referred to herein as UDFA Group 1.

As referred to herein, UDFA Group 2 shall refer to the remaining 87 percent of eligible players not formally drafted. To be eligible, a player must be of a certain age and must apply and enter the Official NFL Draft of that specific year by contacting the NFL. Eligible players are preferably College Seniors. Although, inclusion of younger and older players is contemplated. There are about 2,500 eligible college players every year. In an alternative embodiment, the eligible pool shall comprise those players invited to the NFL Combine. This number is approximately 330 players each year. The NFL Combine, is a process where the most notable eligible college players every year are selected by the NFL teams and the scouts to perform in front of all the teams at one time, to gather such information such as physical indicators and grade performance drills. This is done to assist these teams in their drafts selection process. It takes place approximately two weeks after the Super Bowl in Indianapolis, Ind. (mid-country), and lasts three days. Results of tests or evaluations are compiled during NFL CombineTests/evaluations include: 40-yard dash; Bench press (225 lb repetitions); Vertical jump; Broad jump; 20 yard shuttle; 3 cone drill; 60-yard shuttle; Position-specific drills; Interviews—each team is allowed 60 interviews in 15-minute intervals; Physical measurements; Injury evaluation; Drug screen; The Cybex test; and The Wonderlic Test.

It is contemplated that fans would have access to publications and web sites to view information and even watch clips of eligible pool players.

It is contemplated that fan participation can be in conjunction with a show. In a preferred embodiment, this $8^{th}$ round draft (fan draft), is staged approximately three hours after the last formal draft pick has been completed. This timing allows the fans of each team to compose a list from the eligible pool of players he thinks his/her team should have drafted. It is further contemplated that this show could be an introduction to a series of shows following the fan selected draft choices. The format could lead to further show "spin-off" programming as each of the 32 players can be followed in their endeavor for success. For example, the NFL Network had a show entitled "Hard Knocks" that was successful in obtaining viewership by following NFL training camp of a specific team. The envisioned program could comprise 32 different "reality" stories as players struggle to make a NFL roster and financial success. In another embodiment of the present invention, a sponsor may stage the $8^{th}$ round draft pick as a separate show on another day.

The tally is done through the direction of the sponsor. The selection sequence is in the same order as that of the Official NFL Draft. Trading is not allowed. That is, each team must select the $8^{th}$ round pick chosen by fans. If the fan choice for a given team has already been selected, then the team must select the second choice and so on.

In one embodiment, fans are only allowed to vote within their area code or zip code to prevent fraudulent picks.

It is contemplated that a sponsor would be sought. The sponsor would be required to make a standard sponsorship marketing purchase to obtain entitled rights to the broadcast and surrounding properties. The purchase price could be determined by production costs. The price could also be determined by which network would "buy" the broadcast. The sponsor could be provided for example from the network or the NFL. Monies received from sponsors would be broken down such as the following: the retired players funding 33.3%, television show costs 29%, 8th round draft choices, players costs 19%, team and league charitable contributions 7.9%, production costs 10.8%. Thus as contemplated, a significant part of programming is used to assist the former retired NFL players. In another embodiment of the present invention, the participating fans will be required to "pay to play" or pay per vote. For example, a fan may be required to pay $1.99 before the fan can cast a vote. This is intended to prevent vote "piracy" or misbehavior by fans intending to add fraudulent vote data. Revenue collected from such "pay to play" can be shared with NFL Retired Players Association, NFL, NFL Teams based on revenue received from area code, Network or phone media source, and Marketing entity. For example, if a team receives on an average of about 100,000 votes per locale, then a total of about 3,200,000 votes are received in the data base. If each fan pays $1.99 per vote, then a total of about $6.36 million may be collected for the $8^{th}$ round draft pick. Public voting is conducted via a toll-free number, television network web sites, and via text messages. Draft publications and websites can offer voting "ballots" or procedures. Contestants can vote during and immediately after each draft pick show.

The eighth round players are actually drafted by the teams. Expenses related to the draft are covered. Such expenses could include but are not limited to a bonus for each player drafted in the 8th round (as of 2008 the maximum UDFA Bonus is $27,000 or less, a bonus of at least $50,000 for $8^{th}$ round picks under this program is envisioned), players' transportation and expenses at NFL camp, and equipment costs. Funding is obtained through sponsors, commissions from cell phone call-ins, and "Spin-Off" programming. Profits can be set aside as a fund for the well-being of retired NFL football players not currently under the latest NFL CBA (Collective Bargaining Agreement). Preferably, the funds are a designated part of the sponsorship. For example, these funds are set up as an interest bearing Credit Union and are insured.

It is further contemplated that retired players' needs are determined by a committee of their peers, and that payback of any debt service can be waived pending specific need. It is also contemplated that any and all interest is put back into the fund.

Teams are under no obligation to keep or sign the $8^{th}$ round selected players if they do not make the roster. The $8^{th}$ rounder has an equal chance as of any UDFA or formally drafted player to make an NFL roster. A hidden "Star" player might be produced for that team. It has been said the draft is not an exact science.

The Official NFL Draft contains all of the elements of successful shows such as Survivor, American Idol and Deal or No Deal. The Official NFL Draft had TV ratings in 2006 of 5.2—twice that of the Stanley Cup Finals. These ratings surpass the MLB playoffs and World Series Games as well. Further, the draft is 17 hours of straight coverage not just three or four. Although it is not a sporting event, it has all of the intrigue and drama for many fans. In fact, almost 37 million people watched the 2006 draft.

The draft is a complex version of high's and lows of the NFL fan on how the future of their team was constructed or destructed; see, for example, Miami in 2006-2007. The event is very emotional for the fan. It brings new hope. The slate is clean and "wait until next year" is a reality.

In accordance with an embodiment of the present invention, the system and method disclosed herein provides a means to give fans an opportunity to have a say and participate in the NFL draft for their respective team. For example, a show may be produced by/for and/or shown on a major network or cable channel. The contemplated show is a complementary and supplementary attraction for the present NFL draft. The show generates interest and revenue in an unprecedented manner by involving the fans, the NFL teams, their respective charitable entities and the former players and coaches of the league.

The show would have a national contest with every NFL team allowing one or more fans from each team to participate in the $8^{th}$ round draft pick. On the day following the Official NFL Draft, all of the teams are in a feeding frenzy to call up and solicit UDFAs. Some of these players are rated very highly, some may have had lingering injuries, but there are usually two to five UDFAs that make NFL rosters every year when famous veterans and high draft choices are set adrift. The UDFA sculpts the team.

In accordance with an embodiment of the present invention, prior to the draft, for example, sometime starting in the summer or fall, one or more fans chose potential UDFA players that their team might select in next year's draft. The list will intensify the weekend before the draft as the previous college season unfolds and produces stats and scenarios. However, in order to qualify to be able to vote, each fan must first purchase or agree to respond to a "sponsor" and, then, they can cast their vote. For example, but not limited to, the sponsor could be a beer company, where they send in a number on the label of a bottle or can, or a publisher from whom the fan agrees to take sample magazine packages that will not cost them.

In accordance with an embodiment of the present invention, part of the sponsor funding goes to the network for production costs or media expenses to produce the show. The sponsor benefits through exposure, enhanced good-will, and/or the opportunity to sell more products, give away more samples and/or retain new customer names.

In accordance with an embodiment of the present invention, the show, the NFL and, ideally, every NFL team would agree to the concept, and a percentage of the profits from each team sponsorship would: 1/used to alleviate financial difficulties faced by former NFL players and coaches, who are not qualified for benefits under today's NFL retirement structures; 2/permit teams to support self-selected charities; and/or 3/contribute to league-wide charities. It is contemplated that such philanthropy would motivate further fan participation, which, in turn, would increase revenues for the sponsors and the amount of money the sponsors could contribute. Thus, a philanthropic funding mechanism is disclosed herein.

In accordance with an embodiment of the present invention, each of the voting fans would "purchase" a right to make a choice for their team, as described above. At the end of the Official NFL Draft (beginning Sunday evening), each team's final fan vote would be counted and at least the highest ranking UDFA player would be bid on by that team, as the teams are bidding upon others too. If a team's highest ranked fan UDFA player is taken by another team, then the team bids on the next highest ranking player based on the fan-voted list. This order is based on the previous season's win/loss record, with the worst team drafting first.

In accordance with an embodiment of the present invention, each of the teams is obligated to bid on and sign only one player from the fan-voted list. However, there is no obligation on the team to keep the player on the team, if the player does not work out for a roster spot.

In general, the "Signing Bonus" for an UDFA is as low as $10,000, although it can be as high as $25,000. In accordance with an embodiment of the present invention, each team would be allocated at least $50,000 for the UDFA player signed and at least $20,000 to the team to develop, feed, house, train and teach the UDFA player in that team's pre-season training regimen. As a result, UDFA players would want to be the show pick. Thus, one player that had not been formally drafted is chosen as an $8^{th}$ round draft choice. Each team selects one player in this matter. The order of selection is the selection number of that year's draft sequence. That is, the worst team of the previous year picks first and the super bowl winner picks last.

The show would obtain the right to use like and likeness for every UDFA player that is signed under the show name and be able to do features or a weekly show about the progress of each UDFA player that the fans of that team have chosen.

In accordance with an optional embodiment of the present invention, if a player is signed to the final 53 player roster prior to game one of the 2008 season, the participating fans of that particular team or teams, are put into a drawing. The winner or winners of the drawing may, for example, get free tickets, transportation and lodging to the 2008 Super Bowl care of the show. The show may obtain the rights to use the like and likeness from those participating fans and can do a follow up show on the Super Bowl trip. It is contemplated that each team has one winner.

Finally, the show can sell the broadcast pieces to a network such as NFL, ESPN, Fox, or the like. This would be a major revenue stream.

In accordance with an alternative embodiment of the present invention, the assistance of the NFL and a change in format are needed. In this embodiment there would be a single $8^{th}$ draft choice by each team on behalf of the retired players and through the efforts of the show. Each of the participating teams would be presented with their team's voted picks list after the last choice in round seven of the draft. The votes are tabulated for an available player who is fan chosen and the "Fan Draft" begins.

After the player with the most fan votes has been selected by a team, the vote tabulation for that player may be made available on screen and on line to verify that the pick was accomplished and/or if the player with the most fan votes for a team was already chosen by another team. If the player has already been chosen by another team, the next available pick of a UDFA player shall be chosen and shown. The order in which the teams will select their UDFA players will be based on how the NFL lines them up for that particular season by their previous seasons records.

In general, the UDFA player will be chosen by each NFL team based on the survey of that team's fans only, and the NFL team cannot influence the vote of the fans (i.e., We need a Wide Receiver so vote for that choice). This includes agents, scouts, draftable players or management will not be permitted to vote.

In accordance with one or more embodiments of the present invention, the UDFA pick may not be traded between teams like a normal NFL allocated draft pick can be. In general, a specified amount of time may be allotted for each pick.

In accordance with one or more embodiments of the present invention, the team is not restricted by CAP rules for this pick. Nor will the NFL team have to compensate the UDFA player unless the team signs the player to a long-term deal. Instead, the show will pay each player a pre-designated signing bonus of such as $50,000 or more and each team will be allotted a pre-designated amount such as $20,000 or more by the show as a "development fee" for each pick.

In accordance with one or more embodiments of the present invention, the NFL team is under no obligation to sign the UDFA draft pick to a long-term contract, although all bonus and development monies are non-refundable. However, each selected UDFA player must make their team as in any other drafted player scenario.

In accordance with one or more embodiments of the present invention, a show/NFL committee may be formed for a ruling on a player picked by the fans if the player must be must be disqualified for legal, health or other player status changes.

In general, like and likeness of each team and the team's selected UDFA player, shall be made available for the exclusive use of the show.

In accordance with one or more embodiments of the present invention, the contest may be run between the team's fans to see which pick gets signed long term.

A contemplated goal of the examples set forth herein is to provide retired players with a financial outlet that, although not a pension as per se, can be used for banking procedures, emergencies or like similar issues and can be relied upon that the present NFLPA take for granted in their CBA. It is a fund specially designed for them as the forefathers of the NFL game. It can be handled by a financial fund that would invest the dollars such as AIG or HANCOCK etc. The fund would earn interest, and could invest to gain more interest. Although AIG or various insurance companies or retirement fund corporations would make perfect sense to be the "sponsor", other approved companies such as TIME WARNER, JOHNNY ROCKETS, COORS, CITGO etc. may be contacted.

In accordance with one or more embodiments of the present invention, this could alternatively be accomplished through creation of a Credit Union with the shares being divided among all those legitimate NFL retirees that have served at least a minimum level of playing time in the NFL. Injured players with less time served may also be considered.

In accordance with one or more embodiments of the present invention, the possibility of "spin-off" programming is also contemplated. For example, "fan chosen" players could have their own show on the trials and tribulations of not being drafted by a team but being drafted by fans and how they proceed though training camps to reach their goals.

In accordance with one or more embodiments of the present invention, because there are fans out there by the millions who are emotionally involved in the decisions that their NFL team makes and spend billions of dollars on tickets, parking, concessions, souvenirs and apparel to show loyalty and esprit-decor, if the teams or the NFL can see there is another opportunity that creates further interest in their sport, it is a win. The fan also has an outlet to express themselves in a literal matter to the team they support.

There has thus been outlined, rather broadly, the more important features of the invention in order that the detailed description thereof that follows may be better understood, and in order that the present contribution to the art may be better appreciated. There are, of course, additional features of the invention that will be described further hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced or carried out in various ways. Also, it is to be understood that the phraseology and terminology employed herein are for the purpose of description and should not be regarded as limiting.

Referring now to the drawings, and more particularly, to FIG. 1, there is shown a system for enabling a player selection in a league draft process, generally designated 100, in accordance with an embodiment of the present invention. System 100 includes a player performance collection system 102 that includes weight measurement device 102a, speed measurement device 102b, cognitive testing device 102c, and user observation capture device 102d. System 100 further includes user interface 104, global positioning system (GPS) device 106, display device 108, computer 110, and network 112.

Computer 110 includes components, such as a processor 110a, user interface (not shown), network adapter (not shown), and wireless link (not shown). Computer 110 also contains (or utilizes) one or more databases, such as league database 110b, team database 110c, user database 110d, and player performance database 110e. Processor 110a can be a standard electronic circuit which executes computer programs, containing a processing unit and a control unit.

User interface 104 can be a wireless device 104a, standard laptop or desktop computer 104b, or a telephone 104c. User interface 104 includes industry standard components (not shown) such as a standard user interface and display, a processor, and a storage device. Storage device can be a hard disk drive or other suitable non-volatile storage. User interface 104 also includes a clock device that can be used to provide timestamp data, and various standard interfaces such as a universal serial bus (USB) that can be used to connect to external devices such as a GPS device 106 to provide location data. Exemplary location data include area code, zip code, latitude/longitude, and the like. A wireless communication link enables User interface 104 to communicate with computer 110. Display device 108 can be a standard user interface for inputting and displaying data, such as a LCD or LED monitor, or touch screen with accompanying menus and prompts.

League database 110b, team database 110c, user database 110d, and player performance database 110e are standard repositories, such as databases, that contain data. The data stored in these repositories can be stored on a single or multiple storage mediums. More particularly, player performance database 110e contains data pertaining to players such as results of tests or evaluations compiled during NFL CombineTests/evaluations. Exemplary test or evaluation results include: 40-yard dash; Bench press (225 lb repetitions); Vertical jump; Broad jump; 20 yard shuttle; 3 cone drill; 60-yard shuttle; Position-specific drills; Interviews; Physical measurements; Injury evaluation; Drug screen; The Cybex test; and The Wonderlic Test.

When system 100 is in operation, player performance collection system 102 collects player performance data from input devices 102a-d. Player performance collection system 102 transfers player performance data to computer 110 via network 112. Computer 110 stores player performance data in player database 110e. Computer 110 provides draft order from league database 110b, team preferences from team database 110c, and player performance data from player database 110e to user interface 104. Users interact with system 100 using user interface 104 to select players for each draft. User selections from user interface 104 is received by computer 110 and stored in user database 110d. GPS 106 captures location information of each user at the time of user selection and transmits location data associated with each selection to computer 110 via network 112. Processor 110a computes draft picks for each round based on user selection, team preferences and draft order, and displays the draft pick on display device 108.

Figure 2:
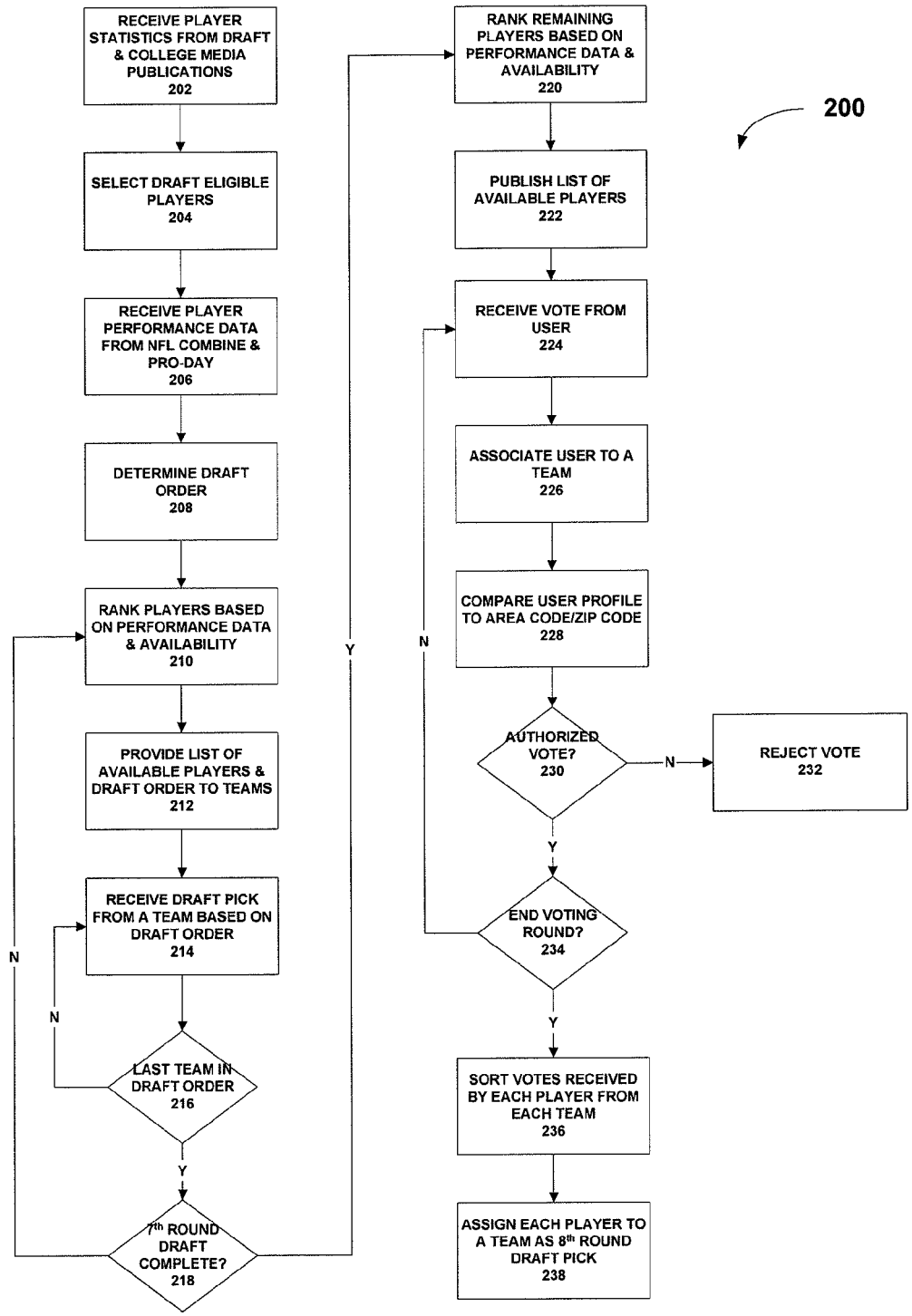
FIG. 2 provides a flowchart illustrating a method in accordance with an embodiment of the present invention for selecting and an assigning a draft eligible player to a team based on user selections or votes.

FIG. 2 illustrates an exemplary method 200 for enabling user participation in player selection during a league draft. More particularly, FIG. 2 illustrates a method for selecting and an assigning a draft eligible player to a team based on user selections or votes. At step 202, system 100 receives player performance data from draft and college media publications. Exemplary player performance data include time set for 40-yard dash; number of 225 lb bench press repetitions; average height of vertical jumps; average distance in broad jumps; 20 yard shuttle; 3 cone drill; 60-yard shuttle; Position-specific drills; Interviews; Physical measurements; Injury evaluation; Drug screen; The Cybex test; and The Wonderlic Test. At step 204, processor 110a determines draft eligible players. As described previously herein, these are players of a predetermined age that have applied and entered the Official Draft of that specific year. The list of draft eligible players generated at step 204 is provided for player participation at NFL Combine and Pro-Day. At step 206, system 100 collects player performance data compiled at NFL Combine and Pro-Day. During NFL Combine and Pro-Day, the following data about draft eligible players are collected: time set for 40-yard dash; number of 225 lb bench press repetitions; average height of vertical jumps; average distance leapt in broad jumps; 20 yard shuttle; 3 cone drill; 60-yard shuttle; Position-specific drills; Interviews; Physical measurements; Injury evaluation; Drug screen; The Cybex test; and The Wonderlic Test.

At step 208, processor 110a determines the order in which each team is allowed to pick players from a list of draft eligible players. In one embodiment of the present invention, order in which the teams are allowed to make their player selections is based on each team's performance during the most recent league season. Processor 110a compiles the draft order using league performance data for each team available from team database 110c. At step 210, an updated list of draft eligible players are compiled based on performance data collected at step 206. In embodiment of the present invention, system 100 generates a list of draft eligible players by sorting players based on performance data and player availability. At step 212, system 100 publishes a list of draft eligible and available players, and order in which teams are allowed to pick players. Each team registers their selection of a player via user interface 104 and system 100 receives player selection by a team at step 214. The order in which teams select players is determined by the draft order generated at step 208. At step 216, processor 110a checks if last team in draft order has registered its player selection. If, at step 216, processor 110a determines that last team in draft order has not registered, then system 100 waits for next team in draft order to register its player selection via user interface 104.

If at step 216 processor 110a determines that it has received player selection from last team in draft order, then at step 218 processor 110a checks whether seven rounds of player selection have been completed. If at step 218 processor 110a determines that seven rounds of player selection is not complete, then system 100 starts next round of draft player selection starting at step 210.

If at step 218 processor 110a determines seven rounds of draft player selection is complete, then at step 220 processor 110a ranks remaining players based on player performance data from player database 110e and availability after seven rounds of draft picks. At step 222, system 100 publishes performance data for remaining available players to users via display device 108. Each user provides system 100, via user interface 104, their player selection at step 224. Prior to accessing system 100, each user is registered in user database 110d. During registration, each user provides their name, address (street, city, zip code), telephone number with area code, and their favorite team. Upon registration, each user is provided with an access code to access system 100 via user interface 104. User profiles created during registration is stored in user database 110d. Thus, each user profile stored in user database 110d associates the user to a team. At step 226, processor associates votes received from a user for a player to a team based on the user-team association in user database 110d.

System 100 also receives location data, via GPS 106, of each user at step 224. At step 228, location data for each user received at step 224 is compared with area code and/or zip code associated with the user's profile in user database 110d. On the basis of comparison performed at step 228, processor 110a determines, at step 230, whether the user is authorized to register their player selection. If the user is not authorized to register their player selection, then their vote is rejected at step 232.

If, at step 230, system 100 authorizes user's player selection, then processor 110a determines, at step 234, whether the user voting round is complete. If the user voting round is not complete, then system continues to receive user selection at step 226. If user voting round is complete, processor 110a determines, at step 236, total votes received from users for each player. At step 238, processor 110a assigns each player to a team as the $8^{th}$ round draft pick. In one embodiment of the present invention, for each team, processor 110a identifies players who have received maximum votes from users associated with that team. User profile stored in user database 110d provides team association for each user. System 100 publishes results of $8^{th}$ round draft selections via display device 108 and/or user interface 104.

As such, those skilled in the art will appreciate that the conception upon which this disclosure is based may readily be utilized as a basis for the designing of other structures, methods and systems for carrying out the several purposes of the present invention. It is important, therefore, that equivalent constructions insofar as they do not depart from the spirit and scope of the present invention, are included in the present invention.

I claim:

1. A computer-implement process of fan participation in draft selection of players for a professional sports team comprising:
   adding, by the computer, a fan round after draft rounds of selection of players;
   ranking, by the computer, a plurality of players remaining after the draft rounds of players selection, wherein the ranking is based on performance data for each player from a players database;
   publishing, by the computer, the performance data for each player remaining after the draft rounds of players selection;
   selecting, by the computer, a voting structure;
   informing, by the computer, at least one fan of said voting structure;
   providing, at the computer, for fan participation in said voting structure, said fan participation comprising casting at least one vote for an undrafted player selected from the plurality of players remaining after the draft rounds of players selection and wherein said fan participation results in a plurality of votes, each said vote in favor of an undrafted player;
   tallying, by the computer, said plurality of votes by a predetermined tallying means; and
   selecting, by the computer, a winner, wherein said winner is drafted by said professional sports team.

2. The computer-implemented process of claim 1, wherein said voting structure is part of a reality show format.

3. The computer-implemented process of claim 2, wherein said reality show provides revenue and wherein at least a portion of said revenue is invested in a fund for retired players of said professional sports team.

4. The computer-implemented process of claim 1, further comprising:
   receiving, by the computer, a fee from each of the plurality of fans for participating in said voting method; and
   tallying, by the computer, said fee received from each of the plurality of fans for participating in said voting method,
   wherein said fee received provides revenue and wherein at least a portion of said revenue is invested in a fund for retired players of said professional sports team.

5. A computer-implemented method of funding a fund for retired players comprising:
   adding, by the computer, a fan round after draft rounds of selection of players;
   selecting, by the computer, a show format said format comprising a method of voting;
   informing, by the computer, a plurality of fans of said voting method;
   receiving, by the computer, a fee from each of the plurality of fans for participating in said voting method;
   providing, by the computer, for fan participation in said voting method, said fan participation comprising casting at least one vote for an undrafted player selected from a plurality of players remaining after the draft rounds of players selection and wherein said fan participation results in a plurality of votes, each said vote in favor of the undrafted player; and
   tallying, by the computer, said plurality of votes by a predetermined tallying means.

6. The computer-implemented method of claim 5, wherein the show format is a reality show format.

7. The computer-implemented method of claim 5, further comprising tallying, by the computer, said fee received from each of the plurality of fans for participating in said voting method, wherein said fee received provides revenue and wherein at least a portion of said revenue is invested in a fund for retired players of said professional sports team.

8. The computer-implemented method of claim 6, wherein said reality show provides revenue and wherein at least a portion of said revenue is invested in a fund for retired players of said professional sports team.

* * * * *